United States Patent [19]
Geffner

[11] 3,692,371
[45] Sept. 19, 1972

[54] ANTI-FRICTION BEARINGS
[72] Inventor: Ted Geffner, Merrick, N.Y.
[73] Assignee: The Barden Corporation, Danbury, Conn.
[22] Filed: Oct. 15, 1971
[21] Appl. No.: 189,730

Related U.S. Application Data

[63] Continuation of Ser. No. 28,719, April 15, 1970, which is a continuation-in-part of Ser. No. 780,440, Dec. 2, 1968, abandoned, which is a continuation-in-part of Ser. No. 586,151, Oct. 12, 1966, Pat. No. 3,446,540.

[52] U.S. Cl. .................................................308/6 C
[51] Int. Cl. ...............................................F16c 29/06
[58] Field of Search............................308/6, 6 C; 29/149.5

[56] References Cited

UNITED STATES PATENTS

| | | | |
|---|---|---|---|
| 3,476,445 | 11/1969 | Carlson | 308/6 |
| 2,672,378 | 3/1954 | McVey | 308/6 |
| 2,929,661 | 3/1960 | Brown | 308/6 |
| 3,446,540 | 5/1969 | Geffner | 308/6 |
| 2,451,359 | 10/1948 | Schlicksupp | 308/6 |
| 2,452,117 | 10/1948 | Ferger | 308/6 |
| 2,503,009 | 4/1950 | Thomson | 308/6 |
| 2,520,785 | 8/1950 | Schlicksupp | 308/6 |
| 2,655,415 | 10/1953 | Briney | 308/6 |
| 3,005,665 | 10/1961 | Thomson et al. | 315/207 |
| 3,265,449 | 8/1966 | Jahn | 308/6 |
| 2,599,969 | 6/1952 | Bajulaz | 308/6 C |

Primary Examiner—Edgar W. Geoghegan
Assistant Examiner—Barry Grossman
Attorney—Sughrue et al.

[57] ABSTRACT

Anti-friction bearings for use between working members that may move relative to each other and wherein the anti-friction bearings include a plurality of bearing elements for supporting loads between the working members and in which one of the bearing elements is constantly in load bearing position while another of the load bearing elements moves between active and inactive positions and when in the active position shares the load with the bearing element in load bearing position.

20 Claims, 7 Drawing Figures

PATENTED SEP 19 1972

INVENTOR.
TED GEFFNER

BY *Jerome Bauer*

ATTORNEY

INVENTOR.
TED GEFFNER
BY
Bauer & Amett
ATTORNEYS

ANTI-FRICTION BEARINGS

CROSS-REFERENCE TO RELATED APPLICATIONS

This is a continuation of application Serial No. 28,719, filed April 15, 1970.

This application continues, in part, material originally included in co-pending application Ser. No. 780,440, entitled Anti-Friction Bearings, filed on Dec. 2, 1968, which continues, in part, material originally included in application Ser. No. 586,151, entitled Anti-Friction Bearings, filed on Oct. 12, 1966, now U.S. Letters Pat. No. 3,446,540, for which claim is made to all legal and equitable benefits which are able to be derived therefrom.

BRIEF SUMMARY OF THE INVENTION

This invention relates to improvements in anti-friction bearings that may be employed between workpieces that move relative to each other.

There has long been a problem in the art of anti-friction bearings of increasing their effective and usable life. Attempts at this have been directed to the use of different and exotic bearing surfaces and load bearing elements that would tend to withstand high loads. Unfortunately, these have resulted in higher and unacceptable manufacturing costs. Other attempts have included the provision of pathways that have enabled the bearings to move and traverse the work members in the manner exemplified by the U.S. Letters Pat. No. 2,451,539. In such instances, the traversing bearing elements wear a groove in the surfaces in which they bear and thus result in shortened bearing life.

In applicant's co-pending application, as mentioned above, traversing bearing elements move between active and inactive positions, thus eliminating and relieving the load bearing forces from constant application to such bearing elements, hence increasing their effective life. Such movement of the bearing elements produces a corresponding movement of an intermediate bearing member whose surfaces are constantly changing and which, in turn, provides a support for other changing supporting bearing elements. This arrangement of constantly changing surfaces results in increased life and improved load carrying characteristics.

The desideratum of the present invention is to provide bearings of improved load carrying characteristics and increased life which are less expensive than those of comparable size known heretofore for performing the same purposes. Furthermore, the present invention enables such bearings to position the loads between working members that may be permitted to move rectilinearly or rotatively.

Further objects and features of the invention reside in the provision of bearings in which loads will be transmitted over large and constantly changing bearing surfaces so that such loads are distributed more efficiently and shared more readily by a larger number of load bearing surfaces at any given moment than has been done heretofore.

Other and further objects of this invention reside in the structures and arrangements hereinafter more fully described with reference to the accompanying drawings.

DETAILED DESCRIPTION

Figure 1:
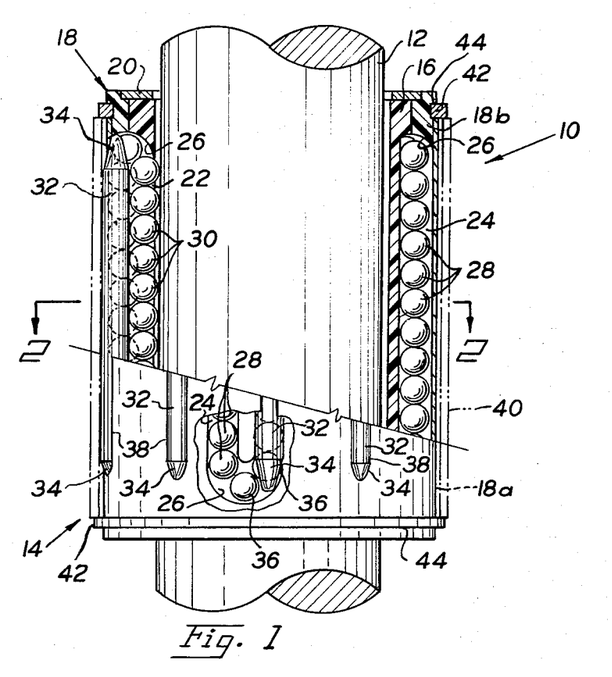
FIG. 1 is a view of an anti-friction bearing constructed according to the invention and with portions thereof broken away to illustrate its working details.
Figure 2:
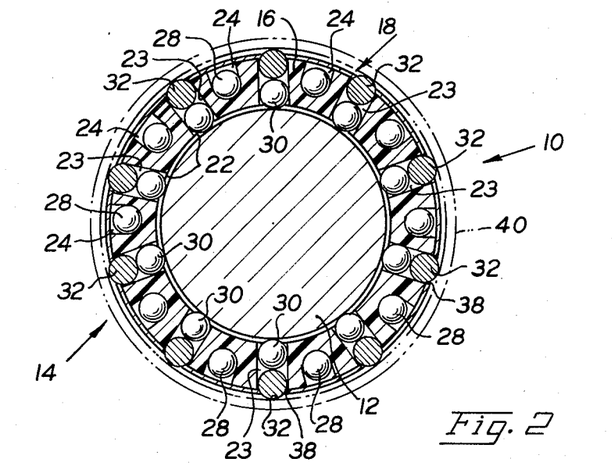
FIG. 2 is a cross-section of FIG. 1 taken along lines 2—2.

Referring now to FIGS. 1 and 2 of the drawing, there is disclosed an anti-friction bearing generally identified by the numeral 10. The anti-friction bearing 10 may be adapted to be positioned along or for relative movement about a working piece, shown in the drawing for illustrative purposes only as a shaft 12. It will be apparent to those skilled in the art that the working piece 12 may be of any desired shape and configuration since its details form no part of this invention.

The bearing 10 comprises a housing that is designated generally by the numeral 14. The housing 14 is shaped in the form of an annulus for convenient circumposition about the workpiece shaft 12. Thus, if the workpiece 12 were of a different shape, the housing would have a corresponding configuration. The housing 14 comprises a retainer element 16 and a sleeve 18. The sleeve 18 is connected to the retainer 16 for conjoint rotation and co-linear movement by end caps, 20, only one of which is illustrated in FIG. 1.

The composite housing 14, comprising the retainer 16, the sleeves 18 and the securing end caps 20, defines an integral structure which moves as a unit. Although the housing 14 is formed of five parts the same should constitute no limitation upon the invention. The effect of the assembly is to result in a single, easily assembled, yet inexpensively manufactured integral housing.

Prior to assembly, the housing 14 is provided with one or more bearing paths that are of endless construction. These endless bearing paths are shown in FIGS. 1 and 2 of the drawing as spaced circumferentially about and defined within the housing 14. The bearing paths are endless in detail in that they return to a starting point, whatever moves therein, and they are completely formed within the housing confines. Each such endless bearing path includes an active portion 22 and an inactive portion 24. Each active portion 22 is operatively connected with the inactive portion 24 of its respective endless path by a smooth curved end 26 at each end of the bearing path. The smooth curved ends 26 define an uninterrupted connection between the active and inactive portions 22 and 24 of each of the endless pathways. The curveds 26 thus terminate each such portion 22 and 24 to effect a smooth merger between such portions and along which load bearing elements, to be described, may move unencumbered and unobstructed.

The inactive portion 24 of each of the endless bearing paths is spaced radially outward of the related active portion 22 of its respective endless bearing path. It will be recognized further that the inactive and active portions 24 and 22 respectively of each endless path is relatively angularly spaced about an arc of the circumference of the housing 14. Thus, the active and inactive portions 22 and 24 of each endless bearing path is offset arcuately with respect to each other and smoothly connected in such offset relationship by the merging curved surfaces 26 positioned at the opposite ends of each endless bearing path.

The bearing structure 10 is adapted to retain at least one or more rollable bearing elements for movement within and along the endless bearing paths. In FIGS. 1 and 2, the rollable bearing element may include a set of a plurality of spherically shaped or ball bearing elements. Although all the load bearing elements that may fill and are movable in each endless bearing path may be of the same size and shape, for convenience of description and illustration they will be differently numbered to identify their functions as they move into different portions of their endless pathways. The load bearing elements illustrated in FIGS. 1 and 2 that are positioned within the inactive portion 24 of the endless bearing paths are identified by the numeral 28 while the bearing elements identified 30 are shown positioned within the active portion 22 of the endless bearing paths.

The active portion 22 of each endless bearing path is formed as a part of an elongated radially directed slot 23 within the retainer element 16, but terminating short of the ends of the retainer element. The slot 23 extends radially completely through the retainer 16 from the inner to the outer surface thereof as is more easily seen in FIG. 2. Positioned within the radial outer portion of the slot 23, remote from but in communication with the bearing elements at 30, is a second bearing element 32. Each bearing element 32 is the form of a roller that extends across the complete length of the outer portion of slot 23 and thus is positioned in overlying relationship with each of those load bearing elements 30 that are in the active bearing position within the housing 14. The bearing elements 28 in the inactive or non-load bearing position within the inactive portion 24 of the endless paths is located alternately and circumferentially spaced between adjacent slots 23 and the roller bearing elements 32.

The roller bearing elements 32 are narrowed at their opposite ends and taper to substantially but not necessarily completely to a point 34 as is shown in FIG. 1. The narrowing ends 34 of the bearing elements 32 are engaged with those bearing elements 30 located in the portion 22 as the balls 30 move along the active load bearing portion 22 of the respective endless bearing path and between the inactive portion 24 of the same path. This is illustrated more fully in the cut-away portion of FIG. 1 wherein the ball bearing elements depicted at 36 and moving in the curved ends 26, are positioned in engagement with the narrowing portion 34 of the roller bearing element 32.

By conveniently designing the slot 23 as a through radial opening in the retainer 16, both the active portion 22 of the endless bearing pathway and the accommodation for the roller bearing elements 32 are at once provided. The formation of the smooth curved merging surface 26 at the ends of the endless bearing paths to connect the portions 22 and 24 together may also be formed conveniently in the retainer 16 and in the outer sleeve 18. The outer sleeve 18 is easily shaped and formed for circumposition about the retainer by separating it into two halves 18a and 18b. After the retainer element 16 and the sleeve halves 18a and 18b are manufactured, they are assembled quickly and easily about each other after the load bearing balls or spherical elements are inserted into the endless bearing paths. In the drawings, it will be seen that the ball bearing elements fully pack their respective endless paths. The roller bearing elements 32 are retained and mounted within the outer radial portions of the slots 23 immediately in engagement with the balls in the active portion 22 of the respective endless bearing path.

The whole housing 14 is then assembled as an integral unit by the application of end caps 20 to opposite ends to connect the sleeve halves 18a and 18b to the retainer element 16 covering relation therewith. It will be noted that the composite covering sleeve halves are provided with a continuous elongated slot 38 which accommodates a respective roller bearing element 32 so the same extends and projects radially outward beyond the housing 14 into a constant load bearing position. Thus, the roller bearing elements 32 are constantly retained in an active load bearing relationship to the housing 14 and are in load bearing engagement with those bearing elements traversing the respective endless bearing path to and from the active bearing position 30 and to and from the active portion 22.

The present anti-friction bearing 10 is adapted to be used between workpieces that may move linearly relative to each other and/or rotatively relative to each other. Such workpieces may be of any shape and form consequently, the anti-friction bearing 10 will be correspondingly configured. Inasmuch as the description has been deemed most easily described for use with a shaft 12, the bearing 10 has been correspondingly made cylindrical in shape. Hence, the bearing 10 will be adapted for use with a further workpiece 40 illustrated in dash lines in FIGS. 1 and 2. The workpiece 40 may be retained in position about the bearing 10 of the present invention by the application of snap rings 42 within annular grooves 44 provided at opposite ends of the bearing.

During relative rectilinear movement of the shaft 12 and the workpiece 40 secured to and about the bearing 10, the bearing elements at 30 in the active load-bearing portion 22 of each respective endless bearing path engage the inner workpiece 12 while the other bearing element 32 of each bearing path engages the outer workpiece 40. At such time, the bearing elements at 30 in the active load bearing position, also engage along the radial inner surface of the roller 32 so there is a transfer of load between the numerous load bearing elements 30 in the load-bearing position and the respective roller 32 which they engage. As shown in FIG. 2, the longitudinal axis of each of the rollers 32 is positioned to intersect the load path vector extending through the points of contact of the balls 30 with each roller 32 and the wordpiece 12 when the balls 30 are in the load bearing position.

As the two workpieces 12 and 40 move linearly relative to each other, the balls in each endless bearing path tend to roll in a direction longitudinally of their respective bearing path. Thus, there is a procession of load bearing elements from the active bearing position 30 in the portion 22 of the endless bearing path to the inactive bearing path position 28 of the inactive portion 24 of the same bearing path. The height of the inactive portion 24 is visibly greater than the size or diameter of the bearing elements moving through such portion 24 so that each such bearing element in position 28 is not in load-bearing relationship with any load applying structure, and, therefore, they are in an inactive position.

As the balls or bearing elements move from their active load-bearing position 30 to their inactive non-load-bearing position 28, they pass through and along the smooth curved end portion 26 where they remain in contact with the narrowing end 34 of their respective elongated roller bearing element 32. During their movement along the curved portions 26 and of their endless path, the bearing elements move at an angle to the direction of linear movement of the housing 14. This is so because each curved portion 26 is angled between the active portion 22 and inactive portion 24 of the endless bearing path. Because the roller ends 34 are narrowing in form the angle of attack and engagement of the balls moving in portions 26 changes progressively with relation to the roller 32. This varying and changing angular relationship of the balls engaging the narrowing ends of the rollers 32 causes the engaged roller 32 to rotate about its axis and thus presents a continually changing surface for load bearing engagement with the balls moving into and out of the active load bearing position 30 and into the active portion 22 of the endless bearing path.

It should be clear to those skilled in the art that as a consequence of the continuous change and movement of the bearing elements or the balls from the load bearing position 30 to the non-load bearing position 28 in their endless position bearing paths, there is a continuous redistribution of forces and loads against different and changing ones of such ball bearing elements. Further, as the bearing elements move along the curved merging surfaces 26 at the opposite ends of their endless bearing path, they apply a rotational force to the narrowing ends of the rollers 32 which cause the rollers to rotate and change their surfaces presented for engagement with the balls 30 at the active load bearing position. By this method, no one surface of the bearing elements 30 or 32 ever absorbs or supports a load for a time more than a fraction of their rotation. Rather, the surfaces of the load bearing elements in load bearing position are constantly changing thereby increasing their effective life.

When the bearing 10 is employed between relatively rotatable workpieces much the same beneficial result occurs. In the case where the workpieces 12 and 40 are relatively rotatable, the roller bearing elements 32 engage the outer workpiece 40 and are caused to rotate within the housing 14. As the roller elements 32 rotate in their load bearing position, they impart a rotational movement to the engaging ball bearing elements in position 30 within the active portion 22. This causes the ball bearing elements to rotate also. In addition, the ball bearing elements in position 30 rotate because of their engagement with the inner workpiece 72 with which they are in load bearing engagement. Thus, the balls and rollers engaging each other equally distribute their loads across many continually changing surface.

In addition, however, the rotation of the roller 32 causes the balls 30 to process within their endless bearing path by engaging the balls 36 in the curved portions 26 of the endless bearing path. This engagement by the narrowing end portions of the rollers 32 with the balls 36 in the curved portions 26 causes the balls 36 to move angularly along the endless bearing path. As a consequence, the balls in the endless bearing path move between their active load bearing position 30 in portion 22 and their inactive, non-load bearing position 28, within the portion 24. Thus, the balls are in continual movement within their endless bearing path even though the workpieces are movable rotatively relative to each other. As a result, the surfaces supporting the loads between the workpieces are continually changing and equally distributing the work forces between the sets of bearing elements whose surfaces are continually in motion.

Figure 3:
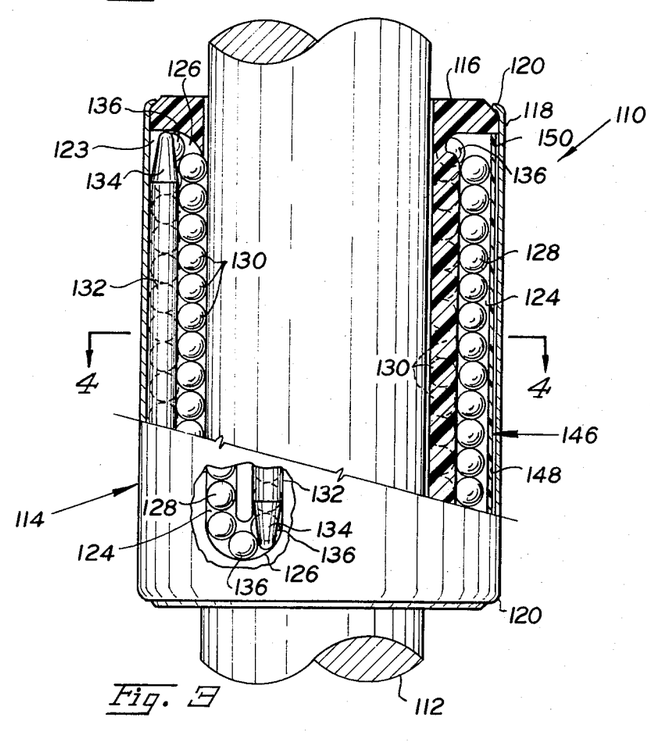
FIG. 3 is a view of a modified anti-friction bearing constructed according to the teaching of the invention, life.
Figure 4:
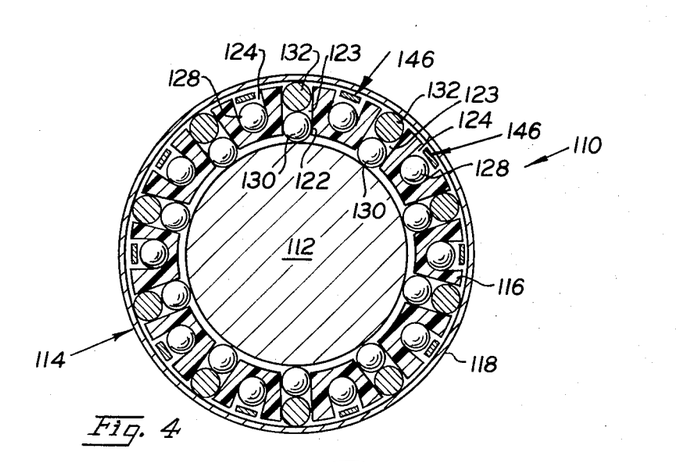
FIG. 4 is a cross-section of FIG. 3 taken along lines 4—4.
Figure 5:
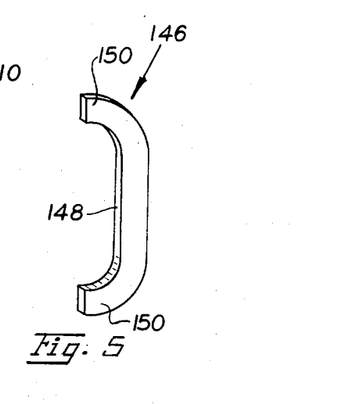
FIG. 5 is a perspective view of a spacer member employed in the embodiment of FIGS. 3 and 4.

The embodiment shown in FIGS. 3, 4 and 5 is substantially the same as that previously described. The present embodiment will be identified by numerals in the series while the digits thereof will correspond to elements previously described in the prior embodiment 10.

Referring to FIGS. 3, 4 and 5, the anti-friction bearing there disclosed is generally identified by the numeral 110. Bearing 110 is adapted to be positioned with respect to a workpiece, hereshown for illustrative purposes only as a circular shaft 112. The housing generally identified by the numeral 114 is a composite but unitary structure comprising a retainer element 116 and an outer sleeve 118.

The details of the retainer element 116 are not too dissimilar from that of the prior embodiment. The retainer 116 is of a one-piece construction having defined therein a plurality of circumferentially spaced radially directed slots 123. Each of the slots 123 defines an active portion 122 along its radially inner part which forms one portion of an endless bearing path that includes an arcuately offset inactive portion 124. As previously described, the inactive portion 124 and the active portion 122 each terminate at their opposite ends in smoothly curved ends which function as merging portions 126. The merging portions 126, at each end of the portions 122 and 124, complete the endless bearing path along which a rollable bearing element or a plurality of such elements are adapted to move between load bearing position and non-load bearing position.

When the rollable bearing element is in load bearing position in its endless bearing path, it is identified by the numeral 130. As previously described, the bearing element 130 in the load bearing position is located within the portion 122 of the endless bearing path. However, as the bearing element moves in the endless bearing path to its non-lead bearing position identified by the number 128, it is in the inactive portion 124 of the bearing path. The inactive portion 124 is visibly larger in size than the bearing element positioned at 128 and, therefore, each such bearing element is free of any load bearing relationship.

This manner of operation has been described with respect to the prior embodiment 10. In practice, the endless bearing path is fully filled with as many rolling bearing elements as it can accommodate. Such bearing elements are shown as balls or spheres because they circulate more freely and present new load bearing surfaces more readily as they move along the portions 122, 126 and 124 which comprise each endless bearing path.

Positioned within the outer portion of each radial slot 123 is a bearing element 132. The bearing element 132 is shown in the form of an elongated roller, the opposite ends of which are provided with progressively narrowing surfaces 134 that approximate, but need not fully approach a point. The rollers 134 completely fill the length of the elongated slot 123, so that their narrowing ends 134 are engaged in progressively changing annular relationship with the bearing elements moving along the respective endless bearing path at the smoothly curved ends 126. For convenience of reference, and identification, such rollers are identified by the numeral 136.

The rotative cooperation between the load bearing elements positioned at 130 within the active portion 122 and the bearing element 132 within the respective slot 123, is the same as previously described in connection with the embodiment 10. Similarly, the changing angle of attack and engagement between the bearing elements positioned at 136 within the curved ends 126 and the narrowing ends 134 of the respective bearing elements 132 is the same as described with respect to the prior embodiment 10.

The present embodiment 110 is essentially the same in operation as the embodiment 10 previously described and, therefore, parts similarly numbered with the 10's digits will perform in the same manner. Hence, it would be redundant and surplussage to repeat the description of the operation of the embodiment 10 as it applies to the present embodiment 110.

In the present embodiment it will be noted that the outer sleeve 118 is of a single or one-part construction that fully encompasses and is positioned about the retainer 116. The sleeve 118 is preferably imperforate in detail and, unlike the embodiment 10, it retains the roller bearing elements 132 within their respective slots 123 by fully covering the same and providing a smooth uninterrupted interior surface against which the bearing elements 132 may roll.

The sleeve 118, being of one piece construction, is rolled or turned over at its opposite ends 120 to provide for relative rotational engagement with corresponding end surfaces of the retainer 116. In the present embodiment 110, the sleeve 118 is adapted to have relative rotation with respect to the retainer 116 whereas in the prior embodiment 10 the two-part sleeve 18 was adapted to be secured for conjoint movement with the retainer 116. Thus, although the sleeve 118 may move rotationally relative to the retainer 116 it is secured for conjoint linear movement with the retainer 116 and thus completes the unitary and integral housing 114.

Inasmuch as the outer sleeve 118 is circumposed radially outward of the bearing elements 132, and does not accommodate the same within the confines thereof, the radial extent of the retainer 116 is increased to fully accommodate the roller bearing elements 132 and the ball bearing elements 130 within the radial slots 123. In consequence, the radial extent of the inactive portion 124 of each endless bearing path is greater in the present embodiment 110 than it was in the prior embodiment 10. In practice, it has been found that the greater radial extent of the portion 124, in which the non-load bearing elements are positioned at 128, must be shortened otherwise there would be too much free movement and play permitted the bearing elements. Hence, the bearing elements at the position 128 would tend to bunch together, move too freely and loosely within the endless bearing path, and thus create a possible wedging action between themselves that will prevent such bearing elements from moving smoothly from the inactive position 128 to the active position 130.

To obviate the difficulties that may be created by the radial elongation of the inactive portion 124 of the endless bearing path, there is provided a shim or spacer means generally identified by the numeral 146 and more fully shown in FIG. 5. The spacer means functions as a shim to shorten the radial extent of the inactive portion 124 of the endless bearing path. Its both thickness 148 is sufficient to retain the bearing elements at the position 128 in proper alignment with each other and in smooth, free circulating relationship in the portion 124. The spacer means 146 terminates in curved ends 150 that are adapted to be located in overlying relationship with the curved ends 126 of each endless bearing path.

There is provided one of each of the spacer means 146 for insertion into the outer radial part of the inactive portion 124 of each endless bearing path. When so positioned, the curved ends 150 overlie and serve to guide the ball bearing elements positioned at 136, in the curved ends 126 of the endless bearing path, for smooth rolling movement beneath and for engagement with the narrowing angular end 134 of each roller bearing element 132. Thus, the spacer means 146 functions to shorten the radial height of portion 124. This reduces the radial space between the bearing elements positioned at 128 and those at 130 so the relative radial distance between them is not so great as to inhibit the free rolling circulation of the bearing elements through and along the endless bearing path.

Inasmuch as the sleeve 118 is rotationally joined to the retainer 116 and forms an integral part of the housing 114, it is possible to treat the sleeve 118 as a substitute for the workpiece 40 described with respect to the embodiment 10. However, if desired, a further workpiece may be secured to the outer surface of the sleeve 118, for rotation therewith.

The operation of the present embodiment 110 is essentially the same as that of the embodiment 10 previously described. During relative rectilinear movement of the workpiece 112 with respect to the sleeve 118, the ball bearing elements positioned at 130 in the endless bearing paths will engage the workpiece 112 and will support the loads transmitted to the bearing 110. Such loads are, in turn, transmitted and distributed equally to the roller bearing elements 132 which engage, in load bearing relationship, the sleeve 118 that may support a further load applying workpiece.

During relative rectilinear movement of the workpieces the bearing elements move to and from their load bearing positions 130, and as they move along the ends 126 of the endless bearing paths, their angle of attack with respect to and engagement with the narrowing ends of the bearing elements 132 change. This produces a rotational force that is applied not only to the ball bearing elements as they move along the position 136, but also against the roller bearing elements 132. As a consequence, the balls revolve to present changing surfaces for engagement with the workpiece 112 and roller 132, and the roller 132 rotates to present changing surfaces for engagement with the inner surface of the sleeve 118. Hence, even though the workpieces move rectilinearly relative to each other, the bearing elements continually present changing bearing surfaces, which results in a bearing structure having a longer effective life span.

During relative rotation of the workpieces, the bearing elements in the position 130 rotates at one-half the rotational speed of the workpiece 112 which they engage. In consequence, their wear is materially decreased. However, and in addition, because of the rotation of the bearing elements 132, the ball bearing elements at 136 are forced to circulate in their endless bearing paths and thereby continually present new bearing surfaces for supporting the loads between the relative load applying workpieces.

Those skilled in the art will recognize that the retainer elements 16 and 116 can be made of easily and inexpensively formed materials inasmuch as they merely are retainers that are not required to support excessive forces. In consequence, such retainers may be conveniently and inexpensively manufactured from well known plastic materials. Much the same is true with respect to the spacer means 146 included within the inactive portion 124 of each of the endless bearing paths.

Figure 6:
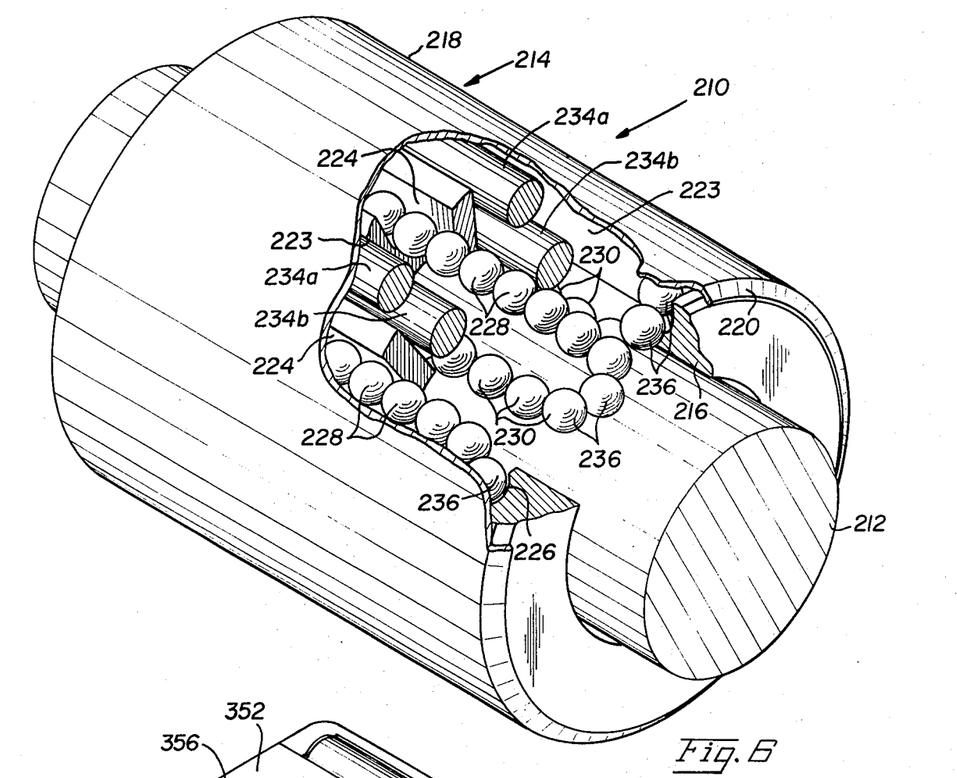
FIG. 6 is a perspective view of another embodiment with portions thereof broken away.

The embodiment shown in FIG. 6 is substantially the same as that previously described and shown in FIGS. 3, 4 and 5. The present embodiment will be identified by numerals in the 200 series while the 10's digits thereof will correspond in structure and function with elements previously described.

Reference is now made to FIG. 6 wherein the anti-friction bearing there disclosed is generally identified by the numeral 210. Bearing 210 is structured much in the arrangement of bearing 110 except that the radial slots 223 contain at least one or more bearing elements 232, here identified for ease of reference by the numerals 232a and 232b. The bearing elements 232a are positioned at the radially outermost extent of the slots 223 while the bearing elements 232b are positioned between or intermediate the bearing elements 230 and 232a. The outermost and intermediate bearing elements 232a and 232b extend for substantially the full length of their respective slots 223 and the intermediate bearing elements 232b may be narrowed (not shown) as is shown and described as at 34 and 134 in the prior embodiments.

The use of the plurality of bearing elements 232 serves to support greater loads transmitted between the shaft 212 and the relatively rotatable and rectilinearly movable outer sleeve 218. Although the present embodiment of FIG. 6 compares with that of FIGS. 3, 4 and 5, those skilled in the art will readily recognize that the teaching thereof is equally applicable to the embodiment of FIGS. 1 and 2.

Figure 7:
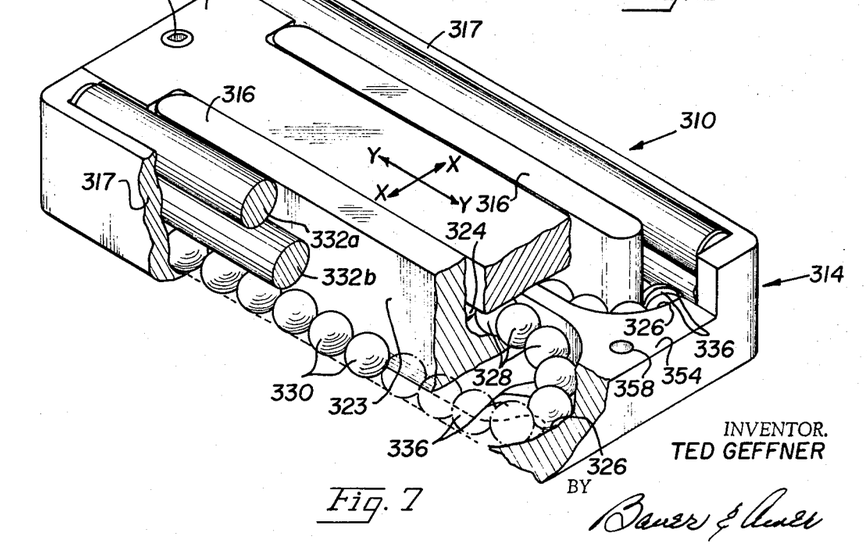
FIG. 7 is a perspective view of another embodiment with portions thereof broken away.

The embodiment of FIG. 7 incorporates the teaching of the aforedescribed embodiments except that it illustrates their use in a planar or flat type anti-friction bearing. Because of the similarities in operative and structural details the elemental details will be identified by numerals in the 300 series with the 10's digits thereof corresponding in structure and function with those previously described.

The flat-type anti-friction bearing of FIG. 7 is more easily identified as a "flatway" because of its ability to support and transmit loads between load bearing members that move in flat or substantially planar paths. The bearing of FIG. 7 is generally identified by the numeral 310 and includes a housing generally identified by the numeral 314 having substantially planar or flat upper and lower surfaces and in which the housing may be fixed to one load member. The housing 314 comprises a retainer structure delineated by the retainer elements 316 that are spaced from outer walls 317 to define the slots 323 in which the active bearing elements 330 and the plurality of bearing elements 332 are contained and project beyond the lower planar surface of the housing for engagement with a load member therebeneath.

The active ball bearing elements move in their endless paths defined by the slots 323 and 324 connected by the merging portions 326 along which the bearing elements 336 are guided for movement into and out of engagement with the intermediate bearing element 332b that is in constant rolling engagement with the outer roller bearing element 332a that project upward and beyond the upper planar or flat surface of the housing for engagement with the load member thereabove. The intermediate bearing elements 332a extend for substantially the length of the slots 323 and their bearing surfaces project or are located beyond the limits of the retainer elements 316 and spaced walls 317.

The assembly of the housing is completed by a cap or cover plate 352 that is substantially I- shaped such that its narrow body fits between the retainer elements 316 to close the inactive portions 324 of the endless bearing paths. The enlarged ends of the cover plate 352 nestle within correspondingly shaped seats 354 at opposite ends of the housing 314 and are fastened in such position by any convenient means 356 that may be mated into openings 358. The enlarged ends of the cover plate 352 restricts the size of the slots 323 so as to prevent the loss or displacement of the roller 324a therefrom until such plate is deliberately removed.

The present bearing 310 may be utilized to permit relative flat or planar type movement in X and Y directions as shown in the drawing or any relative component movement. This is accomplished by connecting or fastening the housing 314 to one load bearing member and placing another load bearing member on the exposed surfaces of the bearing elements 332a. During relative movement between the load bearing members or workpieces, the roller bearing elements will move along their endless paths between their active load bearing positions in the slot 323 and their inactive or non-load bearing positions in slots 324. There is a continuous exchange of bearing surfaces that results in a more efficient and longer lasting bearing.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

What is claimed is:

1. In a bearing for a workpiece,
a housing,
an endless bearing path defined in said housing,
said path including an active portion and an inactive portion,
a plurality of balls movable in and along said bearing path between said active portion wherein said balls are in load bearing position and said inactive portion wherein said balls are in non-load bearing position, and
a roller rotatably mounted in said housing in a load bearing position,
certain of said balls being in load bearing engagement with said roller when said balls are in their load bearing position, said roller being rotatable in response to the movement of said balls in said path, and the longitudinal axis of said roller being positioned to intersect the load path vector extending through the points of contact of certain of said balls with said roller and the workpiece when said balls are in the load bearing position.

2. In a bearing as in claim 1,
said housing having opposed surfaces,
said balls in said active portion projecting from one of said surfaces, and
said roller projecting from the other of said opposed surfaces.

3. In a bearing as in claim 1,
a plurality of bearing paths each being relatively spaced in said housing,
said active and inactive portions of each of said bearing paths being relatively spaced at different levels in said housing,
a plurality of balls movable in each of said bearing paths,
a plurality of rollers rotatably mounted and relatively spaced in said housing between said inactive portions of adjacent bearing paths, each of said rollers being mounted in a load bearing position with respect to one of said paths, and said balls in each path being in load bearing engagement with the adjacent roller when they are in load bearing position.

4. In a bearing as in claim 3,
said housing being an annulus, and
said inactive portion of each of said paths being angularly and radially spaced from said active portion of the respective paths.

5. In a bearing as in claim 4,
said housing comprising a retainer in which said bearing paths are defined,
a sleeve rotatably connected to said retainer for movement relative to said retainer,
and spacer means in each of said inactive portions of each of said bearing paths.

6. In a bearing as in claim 4,
said housing comprising a retainer and a sleeve in which said bearing paths are defined,
and means connecting said sleeve and retainer together for conjoint movement.

7. In a bearing as in claim 1,
spacer means in said inactive path portion for guiding said balls toward said active path portion wherein they are in load bearing position in engagement with said roller.

8. In a bearing as in claim 1,
the longitudinal axis of said roller being substantially in radial alignment with an axis extending through the centers of said balls when they are in load bearing position.

9. In a bearing,
first and second load bearing elements,
a movable housing in which said first and second load bearing elements are retained,
a path defined in said housing in which said first load bearing element moves at an angle to the direction of movement of said housing between load bearing and non-load bearing positions,
said path including a portion thereof into which said first load bearing element moves when in load bearing position and a portion thereof into which said first load bearing element moves when in non-load bearing position, and
a plurality of said second load bearing elements being rotatably retained in said housing in constant load bearing position, one at said second load bearing elements being engageable between said first load bearing element and another of said second load bearing elements when said first load bearing element is in said load bearing position,
said first and said one of said second load bearing elements being engaged as said first load bearing element moves to and from the load bearing position, and the movement of said first load bearing element causing said second load bearing elements to rotate in their load bearing position.

10. In a bearing as in claim 9,
said first load bearing element being a ball and said second load bearing elements being rollers movable with and in the direction of said housing,
said housing including a plurality of said paths defined therein,
a plurality of said balls movable in each of said paths,
each of said paths having a portion thereof positioned at an angle to the direction of movement of said housing to direct said balls for movement at an angle to the direction of movement of said housing,
and at least certain ones of said plurality of balls being engaged with one of said rollers as said balls move in their respective path portion when in load bearing position.

11. A bearing comprising
a housing
a plurality of endless ball paths defined in said housing,
a plurality of balls movable in each of said ball paths between load bearing position and non-load bearing position,
a plurality of rollers rotatably mounted and spaced in said housing, with only one roller for each of said ball paths in rolling engagement with the balls in load bearing position in its respective ball path,
and a portion of each of said paths locating said balls in non-load bearing position in said housing and out of engagement with the rollers in their respective paths.

12. A bearing as in claim 11, there being at least two rollers for each of said ball paths with one of said two rollers spaced from said balls in load bearing position and another of said rollers engaged between said one roller and said balls in load bearing position.

13. A bearing as in claim 12, said housing having relatively flat opposed surfaces, certain of said balls projecting through one of said surfaces and one of said plurality of rollers in the respective path of said projecting balls projecting through the opposed surface.

14. A bearing as in claim 11, said housing comprising a retainer and a sleeve connected for conjoint rotation and in which said paths are defined.

15. A bearing as in claim 11, said housing comprising a retainer in which said paths are defined, and a sleeve rotatably connected to said retainer.

16. A bearing as in claim 11, said one roller for each of said ball paths having a tapered end engaged by said balls in their respective ball paths as said balls move into and out of load bearing position.

17. A bearing as in claim 11, the longitudinal axis of said one roller being intersected by the load path vector extending through the points of contact of said balls with said one roller and the workpiece for the bearing when said balls are in the load bearing position.

18. A bearing comprising a housing having two substantially flat surfaces and a retainer means defining an endless bearing path, said path including load bearing and non-load bearing portions, a plurality of first bearing elements, a plurality of rotatable second bearing elements, said first bearing elements being movable in said bearing path between a load bearing position wherein they project from one of said housing surfaces and a non-load bearing position, and one of said second bearing elements being engaged between said first bearing elements in load bearing position and another of said second bearing elements having a surface thereof projecting from the other of said housing surfaces, said one second bearing element being free of engagement with said first bearing elements in the non-load bearing position.

19. In a bearing, a housing, an endless bearing path defined in said housing, said path including an active portion and an inactive portion, a plurality of first bearing elements movable in and along said bearing path between said active portion wherein the same are in load bearing position and said inactive portion wherein the same are in non-load bearing position, a second bearing element in said housing, and certain of said first bearing elements being in load bearing engagement with said second bearing element when said first bearing elements are in their load bearing position, said second bearing element comprising at least two freely rotatable roller bearing elements, one of said two roller bearing elements being engaged between certain of said first bearing elements in the load bearing position and the other of said roller bearing elements.

20. In a bearing as in claim 19, said housing having two relatively flat surfaces, certain of said first bearing elements projecting through one of said surfaces and said other of said second bearing elements projecting through the other of said surfaces.

* * * * *